(12) United States Patent
Green et al.

(10) Patent No.: US 8,723,875 B2
(45) Date of Patent: *May 13, 2014

(54) WEB-BASED GRAPHICS RENDERING SYSTEM

(71) Applicant: Google Inc., Mountain View, CA (US)

(72) Inventors: Robin Green, Redwood City, CA (US); Matthew Papakipos, Palo Alto, CA (US); Evangelos Kokkevis, Sunnyvale, CA (US); Gregg Tavares, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/733,641

(22) Filed: Jan. 3, 2013

(65) Prior Publication Data

US 2013/0120418 A1    May 16, 2013

Related U.S. Application Data

(63) Continuation of application No. 12/174,586, filed on Jul. 16, 2008, now Pat. No. 8,368,705.

(51) Int. Cl.
*G06T 1/00* (2006.01)
*G06T 15/00* (2011.01)
*G06F 15/00* (2006.01)

(52) U.S. Cl.
USPC .......................................... 345/522; 345/501

(58) Field of Classification Search
CPC ......... G06T 1/00; G06T 1/0092; G06T 15/00; G06T 15/005; G06F 15/00
USPC ................................................ 345/501, 522
See application file for complete search history.

(56) References Cited

U.S. PATENT DOCUMENTS

| 2003/0126311 | A1* | 7/2003 | Kushnirskiy et al. | 709/328 |
| 2006/0174077 | A1 | 8/2006 | Abadi et al. | |
| 2009/0122062 | A1* | 5/2009 | Kilpatrick | 345/426 |

FOREIGN PATENT DOCUMENTS

| WO | WO 01/80098 | 10/2001 |
| WO | WO 2006/114898 | 11/2006 |
| WO | WO 2008/040123 | 4/2008 |

OTHER PUBLICATIONS

Erlingsson, U. et al. "XFI: Software guards for system address spaces", OSDI '06: 7th Symposium on Operating Systems Design and Implementation, pp. 75-88, Nov. 2006.
Ford, B., "VXA: A virtual architecture for durable compressed archives", USENIX File and Storage Technologies, Dec. 2005.
McCamant, S. et al., "Evaluating SFI for a CISC architecture" 15th USENIX Security Symposium, pp. 1-16, Aug. 2006.

(Continued)

*Primary Examiner* — Jacinta M Crawford
(74) *Attorney, Agent, or Firm* — Sterne, Kessler, Goldstein & Fox P.L.L.C.

(57) ABSTRACT

Some embodiments of the present invention provide a system that renders graphics in a computing system that includes a plugin associated with a web browser in the computing system and a web application configured to execute in the web browser. During operation, the web application specifies a graphics model and provides the graphics model to the plugin. Next, the plugin generates a graphics-processing unit (GPU) command stream from the graphics model. Finally, the plugin sends the GPU command stream to a GPU of the computing system, which renders an image corresponding to the graphics model.

20 Claims, 9 Drawing Sheets

(56) References Cited

OTHER PUBLICATIONS

Necula, G., "Proof carrying code", Principles of Programming Languages, pp. 1-14, 1997.
Prasad, V. et al., "Locating system problems using dynamic instrumentation", Ottawa Linux Symposium, pp. 49-64, Jul. 2005.
Wahbe, Robert et al., "Efficient software-based fault isolation", ACM SIGOPS Operating Systems Review, 27(5):203-216, Dec. 1993.
PCT, "International Preliminary Report on Patentability," International Appln. No. and "Written Opinion of the International Searching Authority," conducted by the Korean Intellectual Property Office; PCT/US2009/049678, International Filing Date, Jul. 6, 2009, 6 pages.

* cited by examiner

WEB-BASED GRAPHICS RENDERING SYSTEM

RELATED APPLICATION

The subject matter of this application is also related to the subject matter in a co-pending non-provisional application by J. Bradley Chen, Matthew T. Harren, Matthew Papakipos, David C. Sehr, and Bennet S. Yee, entitled, "Method for Validating an Untrusted Native Code Module," having Ser. No. 12/117,634, and filing date 8 May 2008.

The subject matter of this application is also related to the subject matter in a co-pending non-provisional application by J. Bradley Chen, Matthew T. Harren, Matthew Papakipos, David C. Sehr, Bennet S. Yee, and Gregory Dardyk, entitled, "Method for Safely Executing an Untrusted Native Code Module on a Computing Device," having Ser. No. 12/117,650, and filing date 8 May 2008.

BACKGROUND

1. Field of the Invention

Embodiments of the present invention relate to graphics rendering techniques. More specifically, embodiments of the present invention relate to a system that facilitates web-based rendering of graphics.

2. Related Art

Computer systems often include a number of native applications that require complex three-dimensional (3D) scenes to be rendered, such as computer games and computer-aided design (CAD) systems, To render 3D graphics, these native applications may use graphics application programming interfaces (APIs) that direct calculations related to graphics rendering to dedicated graphics processing units (GPUs). The additional computational power provided by these GPUs can greatly improve graphics quality and throughput.

Web applications, which have become more prevalent in recent years, are typically written in scripting languages that are unable to utilize low-level graphics APIs that provide graphics hardware acceleration. Instead, graphics rendering for web applications is typically performed by CPUs instead of GPUs. The software-based nature of web-based graphics rendering may thus limit the graphics capabilities of web applications. However, unlike native applications, web applications provide a number of advantages. For example, web applications are capable of executing on multiple platforms, do not require installation, and can be more secure than native applications.

Hence, what is needed is a web-based graphics rendering system that enables graphics hardware acceleration for web-based applications.

SUMMARY

Some embodiments of the present invention provide a system for rendering graphics in a computing system. The system includes a plugin associated with a web browser which operates in the computer system, and a web application configured to execute in the web browser. During operation, the web application specifies a graphics model and provides the graphics model to the plugin. Next, the plugin generates a graphics-processing unit (GPU) command stream from the graphics model. Finally, the plugin sends the GPU command stream to a GPU of the computing system, which renders an image corresponding to the graphics model.

In some embodiments, the plugin includes an editing thread that loads the graphics model into a scene graph. In these embodiments, the plugin also includes a render thread that creates a render graph for the graphics model from the scene graph and renders the image using the render graph.

In some embodiments, the scene graph includes a set of parameters, a set of transform nodes, and a set of Shape nodes. In these embodiments, each of the shape nodes is associated with one of the transform nodes, and the shape nodes and the transform nodes are associated with the parameters by subscribing to the parameters.

In some embodiments, the render graph includes a set of one or more render managers and a set of mesh renderers. In these embodiments, each of the mesh renderers corresponds to one of the shape nodes from the scene graph, each of the mesh renderers is associated with one of the render managers, and each of the render managers is configured to specify a rendering order for the associated mesh renderers.

In some embodiments, each of the render managers corresponds to a priority render manager, a z-order render manager, a group render manager, or a performance render manager.

In some embodiments, each of the shape nodes is associated with a set of buffers.

In some embodiments, each of the buffers is at least one of a frame buffer, a vertex buffer, an index buffer, and a texture buffer.

In some embodiments, each of the shape nodes is associated with an effect.

In some embodiments, the effect corresponds to one or more settings for a graphics pipeline.

In some embodiments, pipelining is implemented using the editing thread and the render thread.

In some embodiments, the plugin includes a rendering engine that communicates with the GPU using the GPU command stream.

In some embodiments, the plugin also includes a software renderer configured to render the image using a central processing unit (CPU) of the computing system.

In some embodiments, the graphics model is specified using at least one of an input file and a method call from the web application to the plugin.

In some embodiments, the input file is obtained from a server associated with the web application.

In some embodiments, the system also includes a plugin interface configured to process the method call from the web application to the plugin.

In some embodiments, the plugin interface is associated with an interface description language (IDL).

In some embodiments, the image is rendered within a plugin window associated with the web browser.

In some embodiments, the web application and the plugin are platform independent.

DETAILED DESCRIPTION

Figure 1:
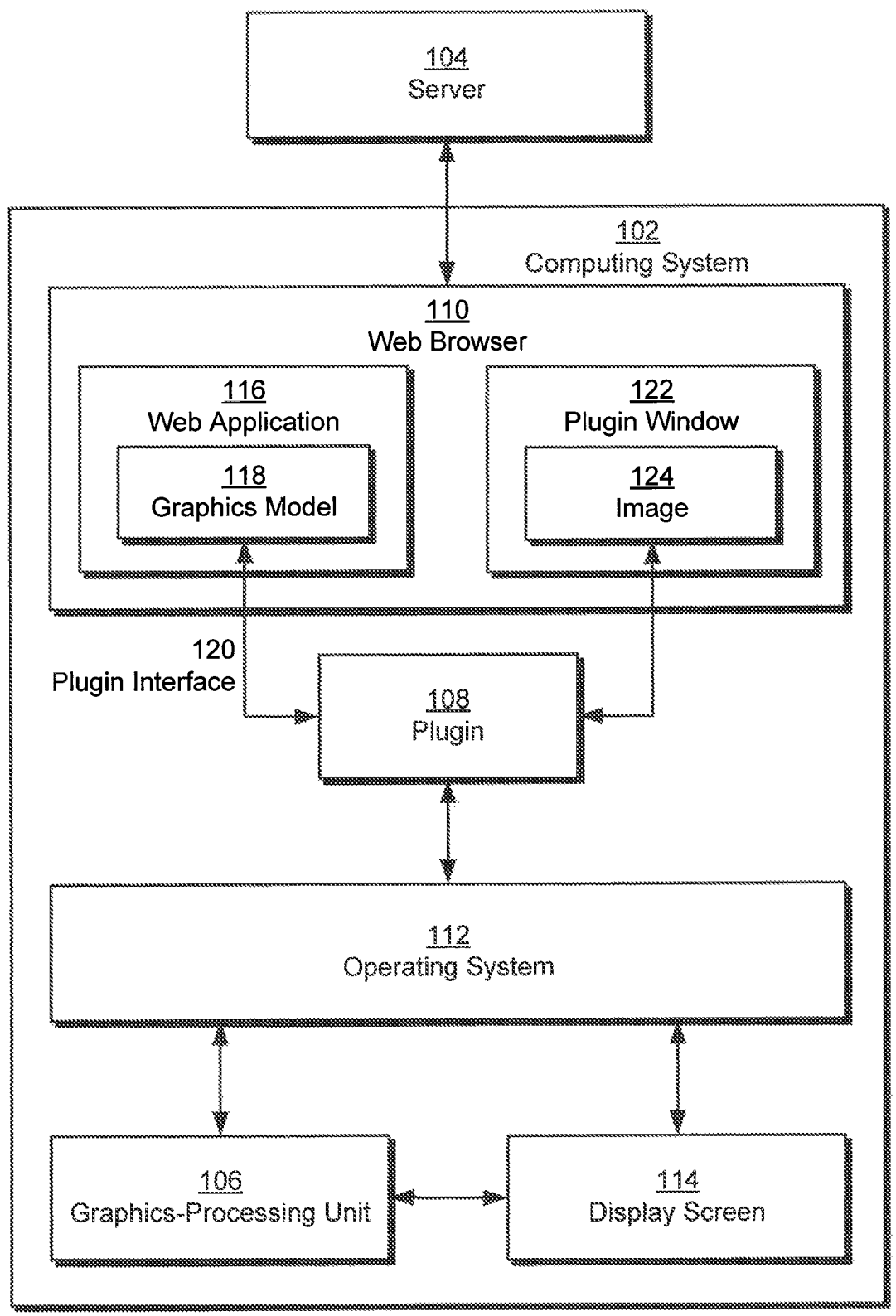
FIG. 1 shows a schematic of a system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments of the present invention provide a method and system for rendering graphics in a computing system. The computing system may be, for example, a personal computer (PC), a mobile phone, a personal digital assistant (PDA), a graphing calculator, a portable media player, a global positioning system (GPS) receiver, and/or another electronic computing device. The graphics may be rendered by specifying a graphics model and rendering the graphics model using a graphics pipeline. One or more stages of the graphics pipeline may be executed using a graphics-processing unit (GPU) of the computing system. An image corresponding to the graphics model may then be displayed on a display screen of the computing system.

More specifically, embodiments of the present invention provide a method and system for web-based graphics rendering. A web application loaded from a web browser is used to specify the graphics model and provide the graphics model to a plugin associated with the web browser. The plugin then generates a GPU command stream from the graphics model and sends the GPU command stream to the GPU, which renders the image within the web browser or within a plugin window associated with the plugin. As a result, embodiments of the present invention enable graphics hardware acceleration for cross-platform web applications that execute within a web browser and do not require installation.

FIG. 1 shows a schematic of a system in accordance with an embodiment of the present invention. As shown in FIG. 1, the system includes a computing system 102 and a server 104. Computing system 102 includes a web application 116 running within a web browser 110, a plugin 108, an operating system 112, a graphics-processing unit (GPU), and a display screen 114. Each of these components is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system 112 that coordinates the use of hardware and software resources on computing system 102, as well as one or more applications (e.g., web browser 110, web application 116) that perform specialized tasks for the user. For example, computing system 102 may include applications such as an email client, address book, document editor, web browser 110, and/or media player. To perform tasks for the user, applications may obtain the use of hardware resources (e.g., processor, memory, I/O components, wireless transmitter, etc.) on computing system 102 from operating system 112, as well as interact with the user through a hardware and/or software framework provided by operating system 112, as described below.

Those skilled in the art will appreciate that computing system 102 may include functionality to execute both native applications and non-native applications. In other words, computing system 102 may include native applications, such as web browser 110, that are locally installed on computing system 102 and specific to operating system 112 and/or one or more hardware devices (e.g., GPU 106) on computing system 102. Such applications may communicate directly with the hardware devices through operating system 112 and/or libraries that are compatible with the hardware devices. However, the installation of native applications may compromise computing system 102 and private data stored on computing system 102.

Computing system 102 may also include functionality to execute platform independent, non-native applications. For example, computing system 102 may obtain web application 116 from server 104 (e.g., an application server) using a network connection with server 104 and load web application 116 within web browser 110. Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a rich Internet application (RIA).

Furthermore, web application 116 may execute on computing system 102 regardless of the type of platform (e.g., operating system 112, drivers, etc.) associated with computing system 102. Though platform independent applications such as web application 116 may be more portable and secure than native applications, such cross-platform applications may lack certain performance capabilities of native applications.

More specifically, non-native applications such as web application 116 may be written using scripting languages that are interpreted rather than compiled, such as Javascript (Javascript™ is a registered trademark of Sun Microsystems, Inc.). The interpretive nature of web application 116 and/or other non-native applications may preclude the non-native applications from accessing low-level libraries and/or application programming interfaces (API) that are available for use by native applications. Consequently, non-native applications may be unable to utilize hardware resources on computing system 102 that are available to native applications through such low-level APIs.

In particular, web application 116 may be unable to use graphics libraries that enable communication with GPU 106, such as Direct3d (Direct3d™ is a registered trademark of Microsoft Corp.) and OpenGL (OpenGL™ is a registered trademark of Silicon Graphics, Inc.). The low-level nature of such graphics libraries may require a large number of method calls to implement graphics rendering, thus precluding efficient and/or practical use by interpreted languages such as Javascript. As a result, graphics rendering in web application 116 may be limited to software that executes on a central processing unit (CPU) of computing system 102 or to compiled languages such as C++.

Because web application 116 may be unable to utilize graphics hardware acceleration in computing system 102, graphics (e.g., three-dimensional (3D) graphics) in web application 116 may be slow and/or suboptimal compared to graphics in native applications that employ graphics hardware acceleration. For example, web application 116 may be unable to use vertex and/or pixel shaders in CPU-based graphics rendering. On the other hand, writing portions of web application 116 in compiled languages such as C++ may introduce problems experienced by native applications, such as lack of portability and security. Moreover, compiled code modules may not integrate into web content as well as scripted web applications. As a result, implementation of applications such as video editors, CAD systems, 3D computer games, photo editors, and/or 3D model catalogs may be difficult, slow, or unwieldy using current web development techniques.

To enable graphics support and graphics hardware acceleration for web application 116, operations related to graphics processing may be offloaded to plugin 108, which may execute separately from web application 116. More specifically, web application 116 may transfer both the storage and processing of data associated with graphics processing to plugin 108. In turn, plugin 108 may expose the capabilities of GPU 106 to web application 116, including the use of vertex and pixel shaders in graphics rendering.

In one or more embodiments of the invention, plugin 108 corresponds to a browser plugin that is associated with web browser 110. For example, plugin 108 may correspond to an ActiveX (ActiveXT™ is a registered trademark of Microsoft Corp.) control, a Netscape Plugin Application Programming Interface (NPAPI) plugin, a Cross Platform Component Object Model (XPCOM) plugin, and/or another component-based plugin that is compatible with web browser 110. Furthermore, communications between plugin 108 and web browser 110 and/or web application 116 may be facilitated by a plugin interface 120.

In one or more embodiments of the invention, plugin interface 120 is generated using an interface description language (IDL), such as Common Object Request Broker Architecture (CORBA), XPCOM, and/or Component Object Model (COM). In particular, plugin interface 120 may be generated from an IDL description that allows web application 116, which may be written in one programming language (e.g., Javascript) to communicate with plugin 108, which may be written in another programming language (e.g., C++). In other words, plugin interface 120 may implement an API between web application 116 and plugin 108. For example, plugin interface 120 may carry out method calls to plugin 108 from web application 116 by executing code from plugin 108 corresponding to the methods called from web application 116. Such method calls may extend both the capabilities and processing power of web application 116 by providing web application 116 access to resources on computing system 102 through plugin 108.

Those skilled in the art will appreciate that the functionality of plugin 108 may be accessed through a variety of other interfaces. For example, plugin interface 120 may implement APIs to allow communication between multiple web-based and/or scripting languages and plugin 108. Furthermore, methods provided by plugin 108 may be directly accessed by applications that utilize a plugin API provided by plugin instead of by plugin interface 120. Such applications may be written in languages supported by the plugin API, such as C or C++. As a result, plugin interface 120 may allow some or all of web application 116 to be written using compiled languages such as C++. Those skilled in the art will also appreciate that plugin interface 120 may be created using non-IDL based mechanisms. For example, plugin interface 120 may be provided by a library that exposes methods and objects in plugin 108 to web application 116 and vice versa.

In one or more embodiments of the invention, web application 116 specifies a graphics model 118 to be rendered and provides graphics model 118 to plugin 108. In particular, web application 116 may include a reference (e.g., hyperlink) to an input file that describes graphics model 118 using a scene description language. For example, graphics model 118 may be described using a Collaborative Design Activity (COLLADA) file. The input file may be stored on a host (e.g., server 104) and obtained by web application 116 using a network connection with the host. Alternatively, the input file may be obtained from a disk on computing system 102 and/or another storage medium. The input file may then be loaded into plugin 108 by a method call (e.g., "loadColladaURL") from web application 116 to plugin 108.

On the other hand, graphics model 118 may be specified using a set of method calls from web application 118 to plugin 108. As mentioned above, the method calls may be facilitated by plugin interface 120. For example, web application 116 may make method calls that describe shapes (e.g., triangle meshes) in graphics model 118, modeling transformations to be applied on the shapes, light sources, a camera position and orientation, a camera perspective, and/or rendering effects (e.g., textures, materials, shaders, etc.) for graphics model 118. Web application 118 may also issue a method call corresponding to a render command to plugin 108 to initiate rendering of graphics model 118. In other words, web application 118 may issue requests for the execution of code to process and render graphics model 118. In one or more embodiments of the invention, such requests are fulfilled by plugin 108 on behalf of web application 118.

More specifically, once graphics model 118 and the render command are obtained by plugin 108, plugin 108 may generate a GPU command stream from graphics model 118 and send the GPU command stream to GPU 106. In particular, plugin 108 may execute a graphics pipeline that renders graphics model 118 by making system calls to operating system 112, which in turn communicates with GPU 106 using a device driver (not shown) corresponding to GPU 106. For example, plugin 108 may generate GPU commands that perform modeling, viewing, and projection transformations on objects within graphics model 118; clipping and culling of geometric primitives; vertex shading, rasterization, and interpolation; and texturing and fragment shading. Furthermore, plugin 108 may manage both the data (e.g., buffers, effects, etc.) and the operations in the graphics pipeline on behalf of web application 116 to minimize the graphics-processing burden on web application 116.

In one or more embodiments of the invention, plugin 108 includes a rendering engine that includes functionality to communicate with GPU 106 using a device driver associated with GPU 106. For example, the rendering engine may correspond to a Direct3d or OpenGL renderer that translates graphics model 118 and the render command from web application 116 into graphics processing instructions for GPU 106. Alternatively, the rendering engine may interface directly with GPU 106 by issuing hardware instructions to GPU 106. Plugin 108 may further include a software renderer that processes and renders graphics model 118 using a CPU on computing system 102 if computing system 102 does not include GPU 106. Plugin 108 is discussed in further detail below with respect to FIG. 2.

Once processing of graphics model 118 by plugin 108 and/or GPU 106 is complete, an image 124 corresponding to graphics model 118 is displayed in a plugin window 122 associated with web browser 110. More specifically, GPU 106 may transmit a bitmap or raster image corresponding to graphics model 118 to a frame buffer that drives display screen 114. Image 124 may then be displayed on display screen 114 within a plugin window 122 associated with web browser 110. For example, plugin window 122 may be displayed as a sub-window or child window within web browser 110. Alternatively, plugin window 122 may be displayed separately from web browser 110 (e.g., as a full screen). However, the state of plugin window 122 may still be based on the state of web browser 110, since the execution of web application 116 and/or plugin 108 is based on the execution of web browser 110. Consequently, the rendering of image 124 within plugin window 122 may only occur if web browser 110 is running.

Graphics model 118 may continue to be processed, updated, and/or rendered within computing system 102 according to the functionality provided by web application 116. For example, web application 116 may correspond to a computer game that updates (i.e., animates) graphics model 118 based on input provided by the user. Alternatively, web application 116 may correspond to a CAD program that allows the use to create and modify both graphics model 118 and the view of graphics model 118 in web browser 110.

In one or more embodiments of the invention, web application 116 uses a native code module to update graphics model 118. Furthermore, the combination of the native code module and plugin 108 may enable real-time 313 graphics rendering and animation in web application 116. Execution of native code modules is described in a co-pending non-provisional application by inventors J. Bradley Chen, Matthew T. Harren, Matthew Papakipos, David C, Sehr, Bennet S. Yee, and Gregory Dardyk, entitled, "Method for Safely Executing an Untrusted Native Code Module on a Computing Device," having Ser. No. 12/117,650, and filing date 8 May 2008, which is incorporated herein by reference. Validation of native code modules is described in a co-pending non-provisional application by J. Bradley Chen, Matthew T. Harren, Matthew Papakipos, David C. Sehr, and Bennet S. Yee, entitled, "Method for Validating an Untrusted Native Code Module," having Ser. No. 12/117,634, and filing date 8 May 2008, which is incorporated herein by reference.

Figure 2:
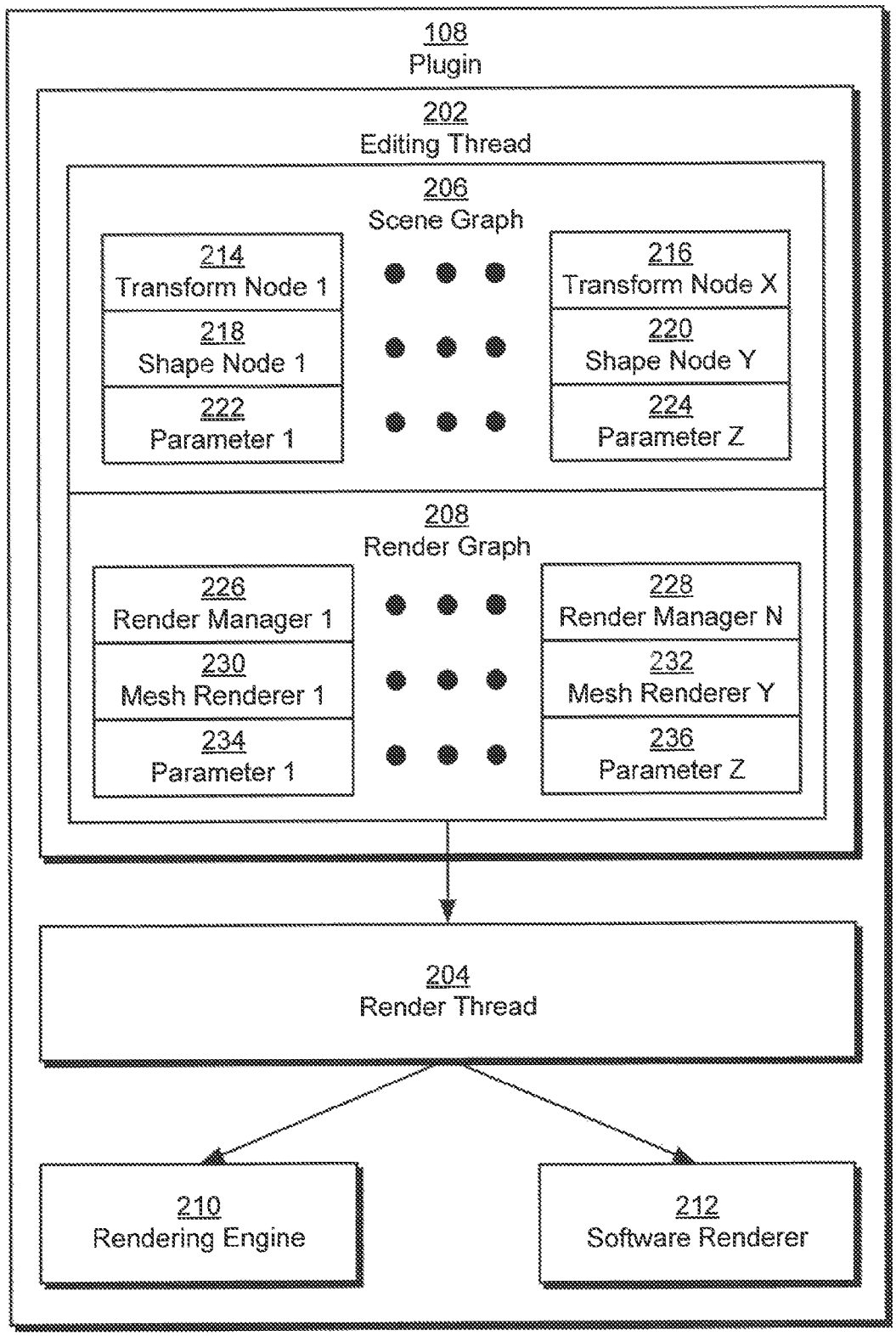
FIG. 2 shows a plugin in accordance with an embodiment of the present invention.

FIG. 2 shows plugin 108 in accordance with an embodiment of the present invention. As described above; plugin 108 may enable graphics hardware acceleration for a web application, such as web application 116 of FIG. 1, Plugin 108 may be written in a programming language that enables communication with GPUs, such as GPU 106 of FIG. 1. For example. plugin 108 may be written in a programming language that allows use of a graphics library such as OpenGL or Direct3d. Furthermore, plugin 108 and the web application may be platform independent, thus enabling graphics hardware acceleration for the web application regardless of the web browser or operating system used to execute the web application.

As shown in FIG. 2, plugin 108 includes an editing thread 202 and a render thread 204. Editing thread 202 is responsible for creating a scene graph 206 from a graphics model (e.g., graphics model 118 of FIG. 1) provided to plugin 108 by the web application. Editing thread 202 may also update scene graph 206 to change the image rendered from the graphics model. For example, editing thread 202 may edit scene graph 206 to animate one or more objects in the graphics model or change the camera perspective in the graphics model.

Scene graph 206 includes a set of transform nodes (e.g., transform node 1 214, transform node x 216) that specify geometric transformations in the graphics model. Scene graph 206 also includes a set of shape nodes (e.g., shape node 1 218, shape node y 220) that specify shapes (e.g., objects) in the graphics model. Finally, scene graph 206 contains a set of parameters (e.g., parameter 1 222, parameter z 224) that may be associated with transform nodes and/or shape nodes through subscriptions to the parameters by the transform and/or shape nodes. The parameters may be used to modify the rendering of the graphics model by providing attributes in the form of Boolean values, floating point values, integer values, arrays, matrices, strings, and/or textures to nodes in scene graph 206. For example, the parameters may rotate, scale, and/or translate one or more shape nodes in scene graph 206; specify the color and/or texture of shape nodes in scene graph 206; and/or provide light source and camera locations within scene graph 206. Scene graph 206 is described in further detail with respect to FIGS. 3, 4A, and 4B.

Editing thread 202 is responsible for creating a render graph 208 for the graphics model from scene graph 206. Render thread 204 may then render the graphics model by traversing render graph 208 and transmitting data and commands from nodes in render graph 208 to a rendering engine 210. As mentioned previously, rendering engine 210 may correspond to a graphics renderer that executes by communicating with a GPU, such as GPU 106 of FIG. 1. For example, rendering engine 210 may correspond to an OpenGL or Direct3d renderer that sends a GPU command stream to a device driver associated with the GPU.

Furthermore, plugin 108 may include multiple rendering engines for compatibility with different platforms. For example, plugin 108 may include an OpenGL renderer and a Direct3d renderer. The renderer used is based on the platform on which plugin 108 is installed and may be selected by plugin 108. In other words, plugin 108 may provide a platform independent rendering system that is implemented using multiple rendering engines for multiple platforms and that executes cross-platform without intervention by the web applications.

Alternatively, rendering engine 210 may interface directly with the GPU by emitting hardware commands to registers and memory on the GPU. As a result, rendering engine 210 may execute one or more stages of a graphics pipeline using the GPU, including the use of fragment and/or pixel shaders in the graphics pipeline. On the other hand, if a GPU is unavailable for use by rendering engine 210, a software renderer 212 may be used by render thread 204 to render images corresponding to the graphics model using a CPU.

In one or more embodiments of the invention, nodes in render graph 208 are ordered differently from nodes in scene graph 206. More specifically, render graph 208 may include a set of mesh renderers (e.g., mesh renderer 1 230, mesh renderer y 232) corresponding to shape nodes (e.g., shape node 1 218, shape node y 220) in scene graph 206. Render graph 208 may also include a set of parameters (e.g., parameter 1 234, parameter z 236) corresponding to parameters (e.g., parameter 1 222, parameter z 224) in scene graph 206. However, render graph 208 contains a set of render managers (e.g., render manager 1 226, render manager n 228) that do not map to transform nodes (e.g., transform node 1 214, transform node x 216) in scene graph 206.

Instead, the render managers may be used to execute the mesh renderers in a specific rendering order. The render managers may be included in render graph 208 to ensure that rendering of objects from the graphics model is both optimized and correct. For example, render graph 208 may render opaque objects by the shader(s) associated with the opaque objects and transparent objects by each object's distance from the camera (i.e., z-order). Render graph 208 is described in further detail below with respect to FIGS. 5, 6A, and 6B.

In one or more embodiments of the invention, editing thread 202 and render thread 204 execute concurrently within plugin 108. Furthermore, editing thread 202 and render thread 204 may also execute in parallel if the computer system on which plugin 108 is installed includes hardware that supports parallelism (e.g., multiple CPUs, multiple CPU cores, etc.). As a result, pipelining may be implemented using editing thread 202 aid render thread 204.

More specifically, a single-threaded graphics rendering system may render a graphics model in between edits to the graphics model. In other words, a single thread may edit a frame of the graphics model and then draw the frame after editing is complete. After the frame is finished rendering, the thread edits the next frame of the graphics model and draws the next frame after editing of the next frame is finished, thus producing the following sequence:

Single thread: edit draw→edit→draw→ . . .

As a result, the frame rate of the rendering system may correspond to the sum of the editing rate for the graphics model and the rendering rate for the graphics model. For example, if editing and rendering the graphics model both occur at 60 Hertz, the frame rate of the single-threaded rendering system may be 30 frames per second.

However, if editing and rendering are handled by separate threads (e.g., editing thread 202 and render thread 204), the graphics model may be rendered by one thread while edits to the next frame are made by another thread, as shown in the following sequence:

Editing thread: edit→edit→edit→edit→ . . .
Render thread: draw→draw→draw→ . . .

In other words, the first frame of the graphics model may be produced by sequential editing and rendering of the graphics model. However, once edits to the first frame are complete, editing thread 202 may proceed immediately with editing the second frame while render thread 204 draws the first frame. Because editing and drawing occur concurrently, the frame rate of plugin 108 may be increased to the slower of the editing rate and the rendering rate rather than the combination of the editing rate and the rendering rate. For example, if editing the graphics model runs at 30 Hertz and rendering the graphics model operates at 40 Hertz, the frame rate of plugin 108 may be 30 frames per second. However, if editing and rendering both run at 40 Hertz, the frame rate of plugin 108 may be 40 frames per second. Consequently, pipelining between editing thread 202 and render thread 204 may increase the frame rate of plugin 108 to double that of a single-threaded system under optimal conditions.

Figure 3:
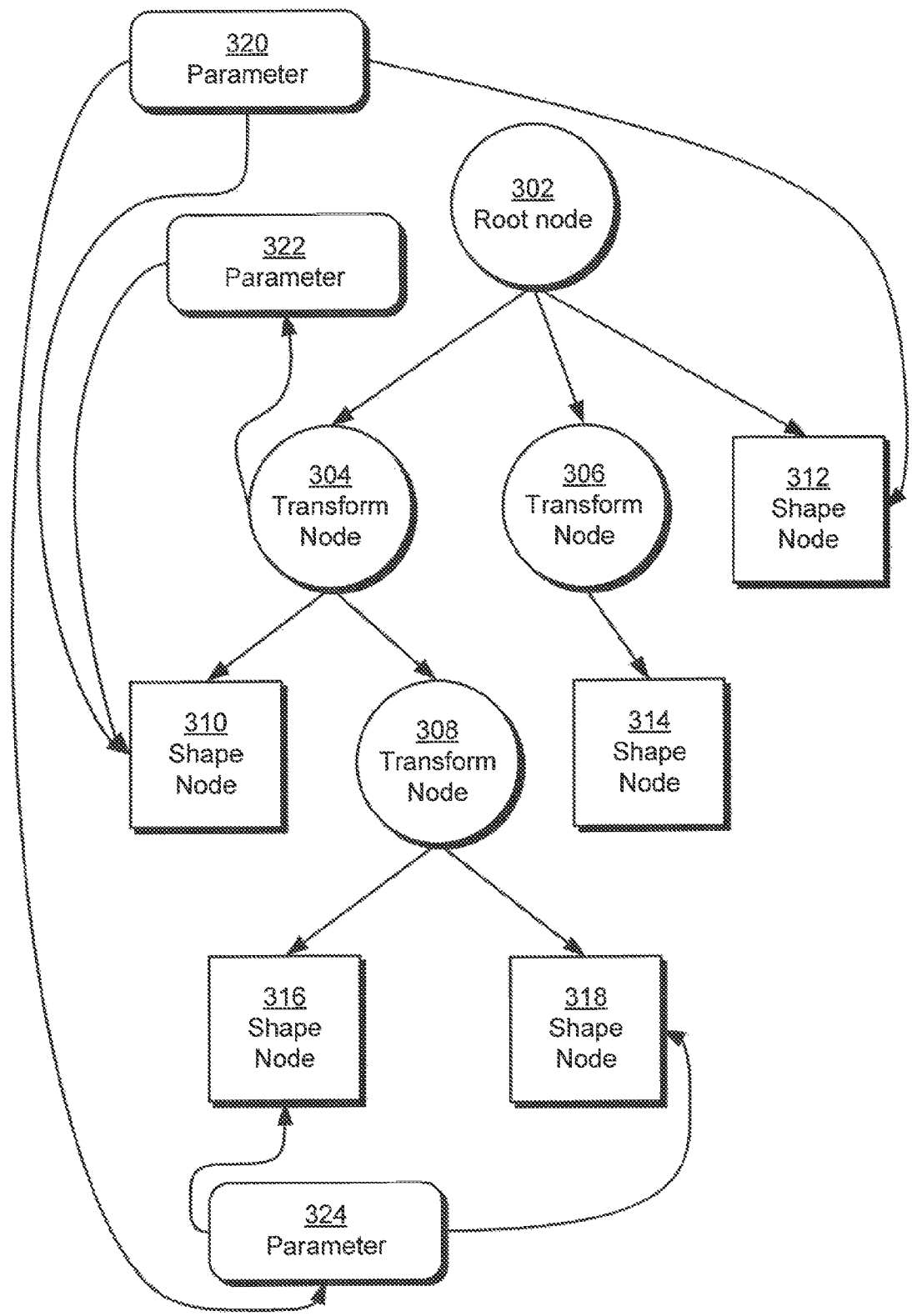
FIG. 3 shows a scene graph in accordance with an embodiment of the present invention.

FIG. 3 shows a scene graph in accordance with an embodiment of the present invention. As discussed above, the scene graph may be created from a graphics model using an editing thread in a plugin. The scene graph may also be managed (e.g., edited, deleted, etc.) by the editing thread. The scene graph may include a root node 302, a set of transform nodes 304-308, a set of shape nodes 310-318, and a set of parameters 320-324. In particular, the scene graph may correspond to a tree with a root node 302, transform nodes 304-308 as internal nodes, and shape nodes 310-318 as leaf nodes. As shown in FIG. 3, root node 302 includes transform nodes 304-306 and shape node 312 as children, transform node 304 includes transform node 308 and shape node 310 as children, transform node 306 includes shape node 314 as a child, and transform node 308 includes shape nodes 316-318 as children. As a result, the scene graph may correspond to a structure that stores objects, transforms, and/or other data used to render the graphics model. The graphics model may then be rendered by creating and traversing a render graph from the scene graph, as discussed below with respect to FIGS. 5, 6A, and 6B.

Root node 302 may correspond to a transform node at the top of the scene graph. Root node 302 and other transform nodes 304-308 may include both transform nodes and shape nodes as children. Root node 302 and transform nodes 304-308 may also include one or more transformation matrices, such as a local matrix and a world matrix. In other words, root node 302 and transform nodes 304-308 may provide modeling transformations for objects in the graphics model, such as rotations, translations, and scaling. Transform nodes are described in further detail below with respect to FIG. 4A.

Shape nodes 310-318 may correspond to nodes that contain data used to render objects in the graphics model. More specifically, shape nodes 310-318 may include a set of buffers that describe the geometry of the objects (e.g., vertices, triangles, etc.) and/or attributes of the objects (e.g., colors, textures, etc.). Each shape node 310-318 may also include an associated effect that specifies shaders, culling, blending, and/or other settings for a graphics pipeline used to render the objects in the shape node. Shape nodes are described in further detail below with respect to FIG. 4B.

Parameters 320-324 may be used to store values that affect the rendering of objects in the graphics model. As described above, parameters 320-324 may correspond to a variety of data types, including Boolean values, integers, floating point numbers, arrays, matrices, strings, and/or textures. Parameters 320-324 may further be associated with a variety of nodes in the scene graph. In particular, parameter 320 is associated with shape nodes 310-312, parameter 322 is associated with transform node 304 and shape node 310, and parameter 324 is associated with shape nodes 316-318.

Parameters 320-324 may also be bound to other parameters in the scene graph using unary or binary operators, as described in further detail below with respect to FIGS. 7A-7C. For example, parameter 324 may be bound to parameter 320 with a unary binding that copies the value of parameter 320 to parameter 324. As a result, changes in the value of parameter 320 may be passed onto parameter 324. Those skilled in the art will appreciate that parameters 320-324 may also support other types of bindings and/or operators. For example, parameters 320-324 may support ternary and n-ary operators. Parameters 320-324 may also support configurations and bindings by programming languages. For example, the value of a parameter 320-324 and/or the operation provided by a binding may be described using code rather than conventional data types and/or operators.

Furthermore, associations between nodes in the scene graph and parameters 320-324 may be established by the creation of a parameter 320-324 from a node and/or by subscribing to a parameter 320-324 from a node. In particular, parameter 322 may be created from a transformation matrix in transform node 304. However, parameter 322 is not automatically inherited by children of transform node 304 (e.g., transform node 308, shape node 310). Instead, other nodes in the scene graph must subscribe to parameter 322 to be affected by parameter 322. More specifically, shape node 310 is subscribed to parameter 322, while transform node 308 is not. As a result, the rendering of shape node 310 may be based on the value of parameter 322, while the rendering of shape nodes 316-318, which are children of transform node 308, may be independent of the value of parameter 322.

Because nodes may be required to explicitly subscribe to parameters 320-324 regardless of the structure of the scene graph, the scene graph may lack global parameters and/or global state, thus allowing flexibility in the creation and rendering of the graphics model. For example, parameters 320-324 may correspond to light sources, transformation matrices, and/or view matrices in the graphics model. Each parameter 320-324 may only be applied to nodes that subscribe to parameter 322. The independence of nodes and parameters in the scene graph thus allows a scene that contains multiple perspectives to be rendered, with each object in the scene taking part in a perspective by subscribing to a set of parameters corresponding to the perspective.

For example, the scene graph of FIG. 3 may be used to produce a scene from a computer game, such as a flight or driving simulator. The scene may contain multiple perspectives corresponding to a front view of the outside world; a rear view of the outside world; a view of the space inside a car or aircraft; and/or a view of a heads-up display (HUD) that provides instructions, statistics, scores, and/or other information related to game play. Objects associated with each perspective may subscribe to the perspective's camera, light sources, transformation matrices, and/or other parameters. Consequently, the rendered scene may contain objects that are rendered from multiple camera views and that interact with the user in different ways. For example, objects associated with the outside world may change as the aircraft or car is steered by the user, while objects associated with the space inside the vehicle may maintain their positions on the display screen regardless of the vehicle's trajectory.

Figure 4A:
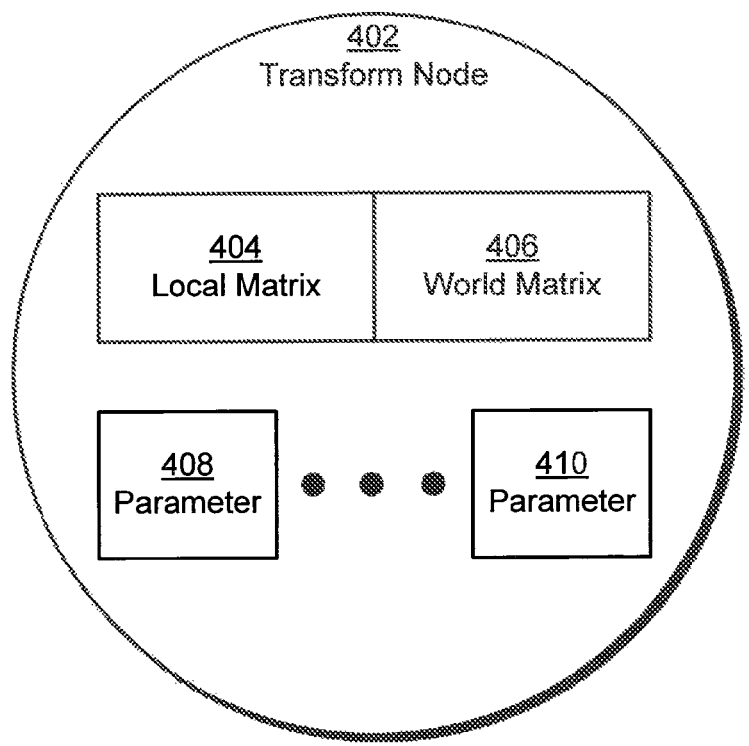
FIG. 4A shows a transform node of a scene graph in accordance with an embodiment of the present invention.

FIG. 4A shows a transform node 402 of a scene graph in accordance with an embodiment of the present invention. As described above, transform node 402 may provide modeling transformations for objects (e.g., shape nodes) in the scene graph. Transform node 402 may correspond to an internal node of the scene graph and include one parent and an arbitrary number of children. In addition, the children of transform node 402 may include both transform nodes and shape nodes. Alternatively, transform node 402 may not include children if the geometric transformation provided by transform node 402 is not used by other nodes in the scene graph.

As shown in FIG. 4A, transform node 402 includes a local matrix 404 and a world matrix 406. In one or more embodiments of the invention, local matrix 404 and world matrix 406 correspond to 4×4 matrices. Local matrix 404 may contain the geometric transformation associated with transform node 402. In particular, local matrix 404 may define a scale, rotate, or translate along one or more axes to be applied to objects (e.g., vertices) associated with transform node 402.

World matrix 406 provides a geometric transformation from the coordinate system of transform node 402 to the world coordinate system. World matrix 406 may be obtained by multiplying the world matrix from a parent node of transform node 402 with local matrix 404. As a result, transformations may be applied to shape nodes by concatenating transformation matrices (e.g., local matrix 404) between the root node of the scene graph (e.g., root node 302 of FIG. 3) and the shape nodes. Furthermore, world matrices may be stored at each transform node of the scene graph to facilitate the calculation of world matrices in child nodes.

Transform node 402 also contains a set of parameters (e.g., parameter 408, parameter 410). The parameters may modify local matrix 404 and/or world matrix 406. For example, the parameters may specify angles of rotation along one or more axes, translations in one or more dimensions, and/or scaling in one or more directions. Transform node 402 may also contain a variety of parameters that are associated with child nodes of transform node 402. For example, transform node 402 may include parameters that affect the shading and blending of shape nodes below transform node 402. Finally, transform node 402 may create a parameter from local matrix 404 and/or world matrix 406. The parameter may be provided to shape nodes to apply the transformation properties of transform node 402 to the rendering of objects in the shape nodes.

Figure 4B:
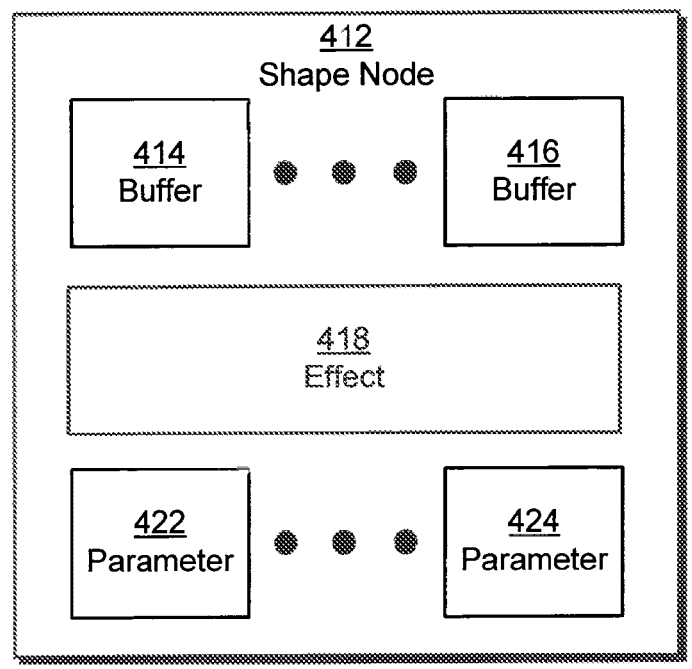
FIG. 4B shows a shape node of a scene graph in accordance with an embodiment of the present invention.

FIG. 4B shows a shape node 412 of a scene graph in accordance with an embodiment of the present invention. In one or more embodiments of the invention, shape node 412 corresponds to a leaf node in the scene graph. Shape node 412 may provide information that is used to render (i.e., draw) an object in the scene graph. Moreover, the object is rendered by creating a mesh renderer from shape node 412 and adding the mesh renderer to a render graph, as discussed below.

As shown in FIG. 4B, shape node 412 includes a set of buffers 414-416, an effect 418, a state 420, and a set of parameters 422-424. Each buffer 414-416 may represent a one- or two-dimensional array of vectors. Each vector may include one to four components, and each component may include a floating point or integer value. More specifically, buffers 414-416 may be used to define the geometry of one or more objects associated with shape node 412. For example, buffers 414-416 may include one or more vertex buffers that specify the coordinates, normals, tangents, binormals, colors, relative light positions, texture coordinates, and/or other attributes of 3D or four-dimensional (4D) vertices in shape node 412. Buffers 414-416 may also contain one or more index buffers that specify polygons to be built from vertices in the vertex buffers. In addition, buffers 414-416 may include one or more texture buffers that contain texture maps to be applied to the polygons during fragment shading.

Effect 418 may include settings for a graphics pipeline used to render the object. More specifically, effect 418 may correspond to an atomic rendering description of the object.

The description may include one or more shaders (e.g., pixel shaders, vertex shaders) to be used in the graphics pipeline. The shaders may correspond to programs that are executed by a GPU (e.g., GPU 106 of FIG. 1) to alter pixel and/or vertex attributes at various points in the graphics pipeline. In addition, effect 418 may include a set of shader parameters that modify the behaviors of the shaders. For example, the shader parameters may specify light sources, colors, and/or textures that are used by the shaders to render the object. Effect 418 may further create and initialize one or more parameters 422-424 within shape node 412 using the shader parameters and their associated values. The newly created parameters may then be bound to other parameters in the scene graph, such as parameters for transformation matrices, view matrices, and/or projection matrices.

Effect 418 may also include a set of states associated with the graphics pipeline. The states may include render state information associated with shape node 412. In particular, the states may indicate differences from the default graphics pipeline to be applied to shape node 412. For example, states within effect 418 may specify blending operations, depth-culling rules, texture formats, and/or other render settings.

As with transform nodes in the scene graph, shape node 412 includes a set of parameters 422-424. Parameters 422-424 may be created from internal parameters associated with effect 418, Parameters 422-424 may also be bound to parameters from other nodes in the scene graph, such as parameters for transformation matrices, view and projection matrices, colors, and/or other attributes that may affect the rendering of the object. Values for parameters 422-424 may then be passed to effect 418 to execute the graphics pipeline using the mesh renderer associated with shape node 412.

Figure 5:
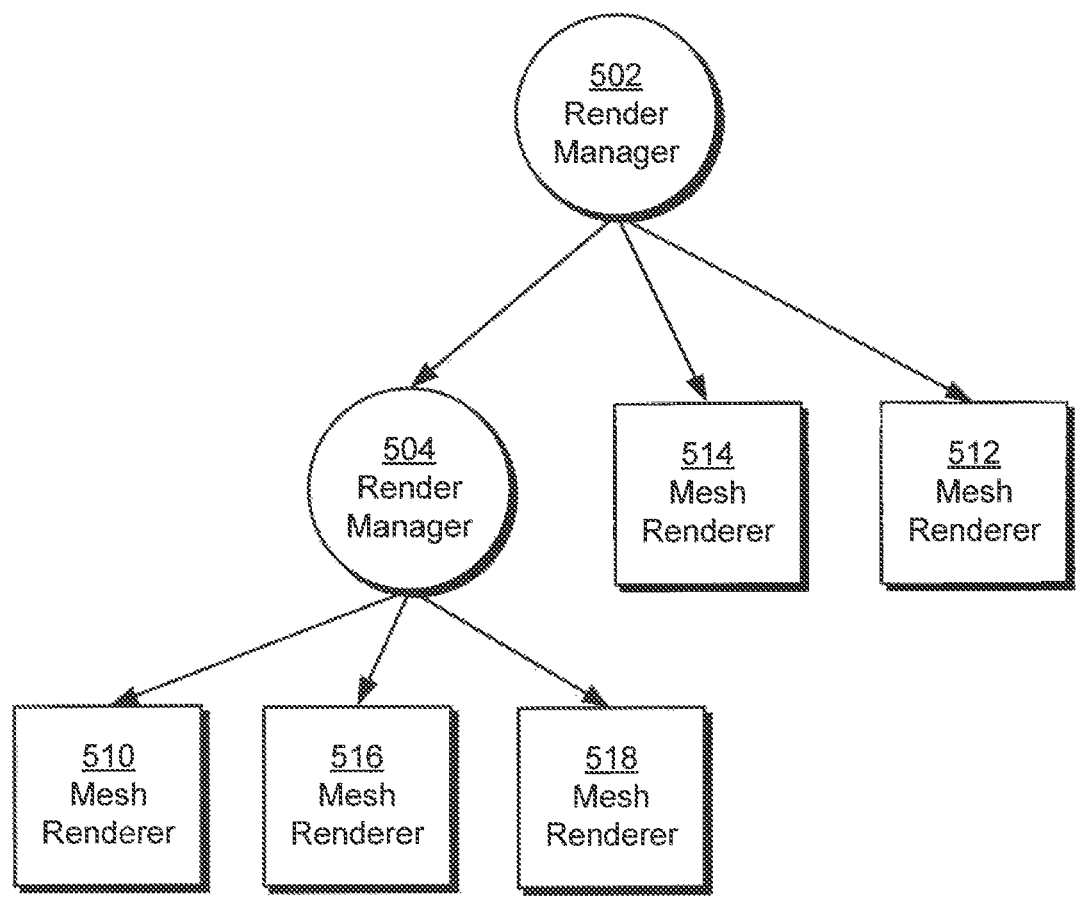
FIG. 5 shows a render graph in accordance with an embodiment of the present invention.

FIG. 5 shows a render graph in accordance with an embodiment of the present invention. The render graph may be created by an editing thread from a scene graph, such as the scene graph of FIG. 3. In addition, the render graph may be used by a render thread to render a graphics model loaded into the scene graph. As with the scene graph, the render graph may be structured as a tree with nodes. As shown in FIG. 5, the nodes include two render managers 502-504 and a set of mesh renderers 510-518. Render managers 502-504 may correspond to root or internal nodes of the render graph, while mesh renderers 510-518 may correspond to leaf nodes in the render graph. In particular, render manager 502 is the root node of the render graph and includes render manager 504 and mesh renderers 512-514 as children. Render manager 504 includes mesh renderer 510 and mesh renderers 516-518 as children.

As mentioned previously, mesh renderers 510-518 may be created from shape nodes in a scene graph, such as shape nodes 310-318 of FIG. 3. More specifically, mesh renderers 510-518 may include copies of or references to information stored in the corresponding shape nodes. The information may then be used by the mesh renderers 510-518 to render objects corresponding to the shape nodes. Furthermore, each mesh renderer 510-518 may also be tracked by the corresponding shape node and updated based on changes to the shape node. As a result, deletion of a shape node and/or toggling of a shape's visibility may be reflected in the render graph by deleting or updating the mesh renderer 510-518 tracked by the shape node. Mesh renderers are described in further detail below with respect to FIG. 6B.

In one or more embodiments of the invention, render managers 502-504 specify the order in which objects are rendered by mesh renderers 510-518. To render the objects, the render graph may be traversed beginning with the root node, or render manager 502. Render manager 502 may then dictate the order of traversal among its children based on parameters associated with the children. In particular, render manager 502 may specify a rendering order for render manager 504 and mesh renderers 512-514 according to a render context associated with render manager 502. The render context may be based on parameters such as priority, z-order, and/or other parameters that affect the performance and accuracy of rendering objects in the scene. The remainder of the render graph may then be traversed according to the ordering of child nodes provided by render manager 502, as well as subsequent orderings of child nodes by other render managers in the render graph (e.g., render manager 504). Render managers are described in further detail below with respect to FIG. 6A.

For example, render manager 502 may specify the rendering order of its child nodes as mesh renderer 514, render manager 504, and mesh renderer 512. In other words, mesh renderer 514 may render its associated object first. Next, render manager 504 may execute by specifying a rendering order of its children as mesh renderer 516, mesh renderer 518, and mesh renderer 510. Finally, after mesh renderers 516, 518, and 510 have completed rendering in that order, mesh renderer 512 may render the final object in the scene. As a result, mesh renderers 510-518 are rendered in order of mesh renderer 514, mesh renderer 516, mesh renderer 518, mesh renderer 510, and mesh renderer 512. Furthermore, the rendering order of mesh renderers 510-518 may be changed by altering the structure of the render graph and/or changing the render contexts associated with render managers 502-504.

Figure 6A:
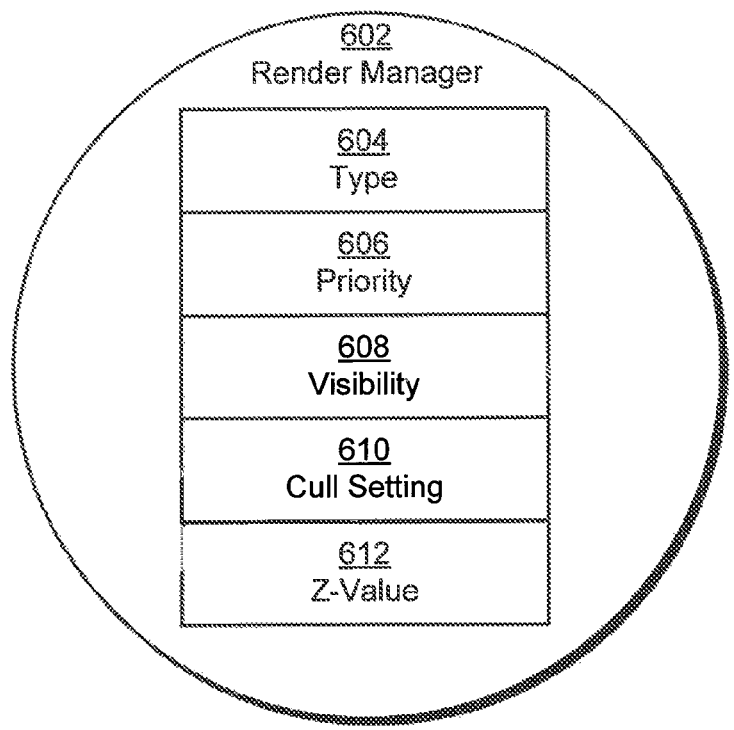
FIG. 6A shows a render manager of a render graph in accordance with an embodiment of the present invention.

FIG. 6A shows a render manager 602 of a render graph in accordance with an embodiment of the present invention. Render manager 602 may be included in the render graph to manage the rendering order of its child nodes of render manager 602. More specifically, render manager 602 may sort its children based on parameters and/or other attributes of the children. Furthermore, render manager 602 may also include some or all of the parameters to allow a parent render manager 602 (e.g., a root node of the render graph) to order render manager 602 with its other children.

In one or more embodiments of the invention, render manager 602 includes a type 604 that affects the rendering order of its children. In other words, type 604 specifies the rendering context of render manager 602. Moreover, type 604 may be set to one of several rendering contexts. First, type 604 may cause render manager 602 to be a priority render manager that sorts its children based on a priority 606 parameter of each child node. A priority render manager may be used when rendering of objects is to happen in a specific order. For example, a priority render manager may be used to clear the screen before rendering other objects in the scene or create a full-screen effect after all other objects are rendered. Furthermore, priority 606 may be set in render manager 602 to change the rendering order of its children with respect to other nodes in the render graph.

Render manager 602 may also be a z-order render manager that orders its children by a z-value 612 parameter of each child node. In one or more embodiments of the invention, z-value 612 corresponds to the node's z-coordinate, or depth from a camera in the scene. A z-ordered render manager may be used to order transparent objects, which may require rendering from back to front for accurate rendering of the scene. Those skilled in the art will appreciate that z-value 612 may be defined in a variety of ways for both render managers and mesh renderers. For example, z-value 612 for a mesh renderer may be set as the local origin of the mesh renderer. Similarly, z-value 612 in render manager 602 may be based on the z-values of its Child nodes and/or assigned a value to affect the rendering order of Objects in the render graph.

Render manager 602 may further correspond to a group render manager that renders its children in a non-specific order. However, children of the group render manager may not be rendered if a visibility 608 of the group render manager is set to false or a cull setting 610 of the group render manager indicates that the group render manager is to be culled.

Finally, render manager 602 may be a performance render manager that orders its children to optimize the rendering process. In particular, a performance render manager may perform back-face culling and/or occlusion culling to remove polygons that do not need to be drawn. The performance render manager may also order its children by attributes such as effect to increase the rendering speed of objects in the scene.

Figure 6B:
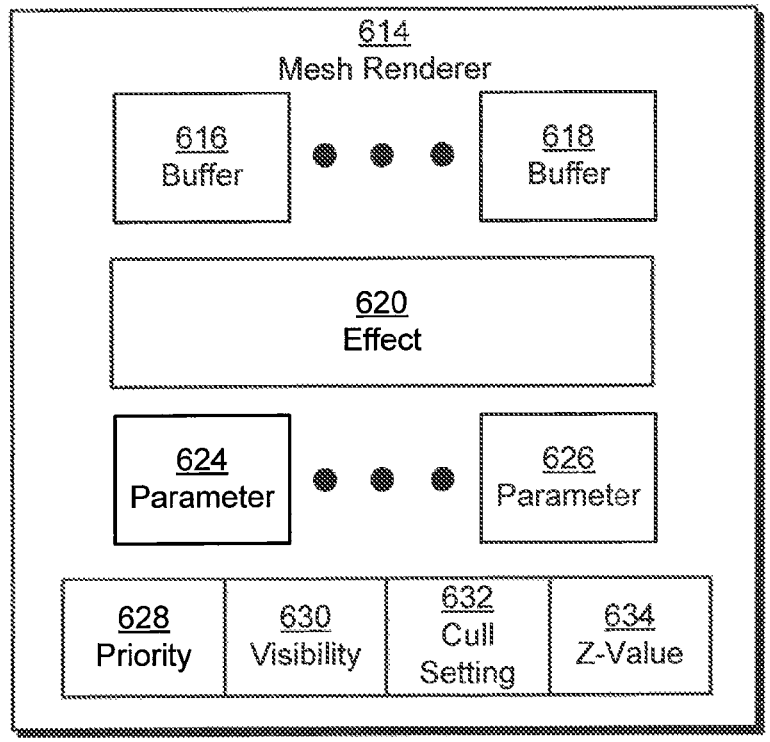
FIG. 6B shows a mesh renderer of a render graph in accordance with an embodiment of the present invention.

FIG. 6B shows a mesh renderer 614 of a render graph in accordance with an embodiment of the present invention. As described above, mesh renderer 614 may be created from a shape node in a scene graph.

Consequently, mesh renderer 614 may include or reference all data stored in the shape node, such as a set of buffers 616-618 and an effect 620. Mesh renderer 614 also includes a set of parameters 624-626 that correspond to parameters found in the shape node, as well as parameters bound to mesh renderer 614 to enable rendering of the object. For example, mesh renderer 614 may include parameters that are required by effect 620 to fully encapsulate the graphics pipeline for the object, such as world, view, and projection matrices.

Mesh renderer 614 may additionally include parameters that affect the order in which mesh renderer 614 is visited in the render graph, if such parameters are not already defined in the corresponding shape node. As shown in FIG. 6B, the parameters include a priority 628, a visibility 630, a cull setting 632, and a z-value 634.

Priority 628 may correspond to a value that is manually set for mesh renderer 614. In other words, priority 628 may be used to manipulate the rendering order of mesh renderer 614 with respect to other nodes in the render graph. In addition, priority 628 may be examined by a priority render manager in ordering its children, as discussed above. As a result, priority 628 may be used to create certain rendering effects, such as clearing a screen or generating a full-screen effect.

Visibility 630 may correspond to a parameter that is set to enable or prevent the rendering of the object associated with mesh renderer 614. For example, if the shape node from which mesh renderer 614 is constructed is invisible, visibility 630 may be set to false to reflect the object's invisibility. Visibility 630 may thus stop mesh renderer 614 from rendering the object during traversal of the render graph.

Cull setting 632 may correspond to a Boolean value that specifies whether the object stored in mesh renderer 614 should be culled. Cull setting 632 may be set by performing calculations that check for back-face, occlusion, and/or bounding-box culling. As with visibility 630, cull setting 632 may prevent mesh renderer 614 from rendering the object during traversal of the render graph.

Z-value 634 may indicate the object's distance from a camera along the z-axis. As mentioned previously, z-value 634 may be based on the local origin of mesh renderer 614. Z-value 634 may also be arbitrarily set or calculated based on other parameters (e.g., parameters 624-626) in mesh renderer 614, such as vertex coordinates. Z-value 634 may be examined by a z-order render manager to render objects (e.g. transparent objects) based on their depth.

Figure 7A:
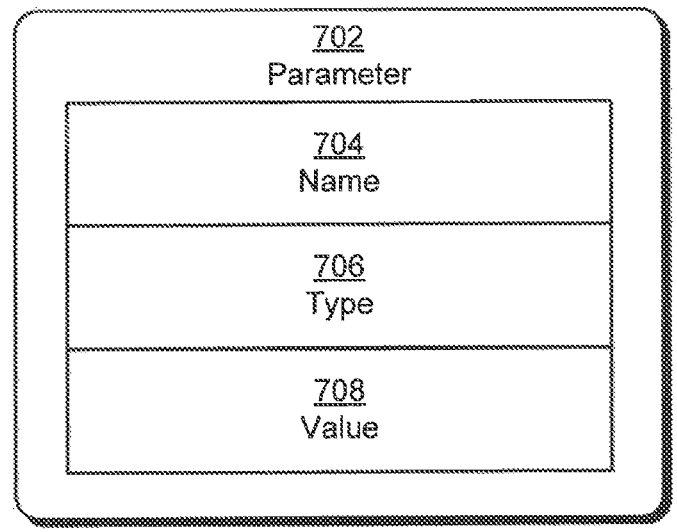
FIG. 7A shows a parameter in accordance with an embodiment of the present invention.

FIG. 7A shows a parameter 702 in accordance with an embodiment of the present invention. Parameter 702 may be used to affect the rendering of one or more objects in a graphics model, such as graphics model 118 of FIG. 1. More specifically, parameter 702 may be created by a transform node or shape node in a scene graph. To use parameter 702, transform nodes and shape nodes in the scene graph may subscribe to parameter 702. A mesh renderer may then inherit parameter 702 from an associated shape node and render an object described in the shape node based on parameter 702. Parameter 702 may also be added to the mesh renderer if the effect assigned to the mesh renderer requires parameter 702 to execute a graphics pipeline.

As shown in FIG. 7A, parameter 702 includes a name 704, a type 706, and a value 708. Name 704 may allow parameter 702 to be identified by its role in the scene graph and/or render graph. For example, name 704 may be set to "ball_color" if parameter 702 corresponds to the color of a ball in the graphics model. Similarly, name 704 may be set to "turret_angle" if parameter 704 specifies an angle at which a turret mesh is rotated within the graphics model.

Type 706 may correspond to the type of data stored in parameter 702. In particular, type 706 may correspond to a Boolean value, one or more floating point numbers, one or more integers, an array, a matrix, a string, and/or texture. As a result, parameter 702 may provide either numeric or non-numeric input to the rendering of objects in the graphics model. For example, parameter 702 may specify the size of an object in the graphics model by providing a 4×4 scaling matrix or a descriptive string such as "large", "medium", or "small".

Value 708 stores a data value corresponding to type 706. Value 708 may be set by a transform node or shape node of the scene graph. For example, value 708 may store a transformation matrix from a transform node or a texture used by a shape node. Because parameter 702 may be associated with multiple transform nodes, shape nodes, and/or mesh renderers, value 708 may affect the rendering of multiple objects in the graphics model. For example, value 708 may be used as an input to a modeling transformation or a shader. In addition, parameter 702 may be bound to one or more other parameters as an input or output. Consequently, value 708 may be updated based on one or more parameters bound to parameter 702 as inputs. Similarly, value 708 may be used to update other parameters bound to parameter 702 as outputs.

Figure 7B:
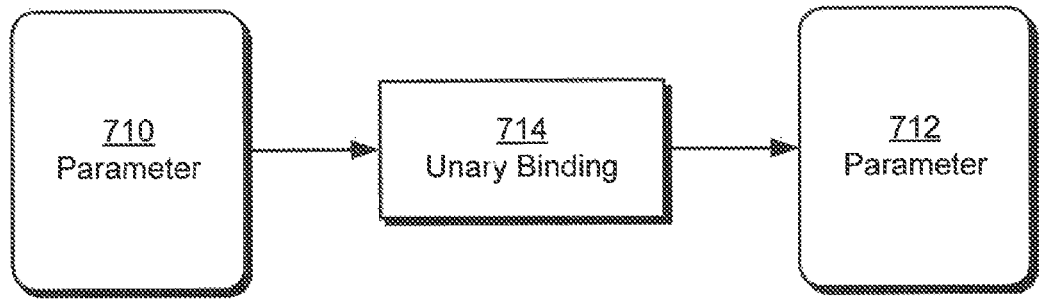
FIG. 7B shows a unary binding between a set of parameters in accordance with an embodiment of the present invention.

FIG. 7B shows a unary binding 714 between a set of parameters 710-712 in accordance with an embodiment of the present invention. In particular, parameter 710 corresponds to a source parameter and parameter 712 corresponds to a destination parameter. Furthermore, unary binding 714 may act as an assignment operator from parameter 710 to parameter 712. As a result, updates to the value of parameter 710 may be copied to parameter 712 by unary binding 714. For example, a change in the location or color of a light source may be copied to all parameters within the scene graph that are bound to the light source. Unary binding 714 may also be removed to prevent further changes in parameter 710 from affecting parameter 712.

Figure 7C:
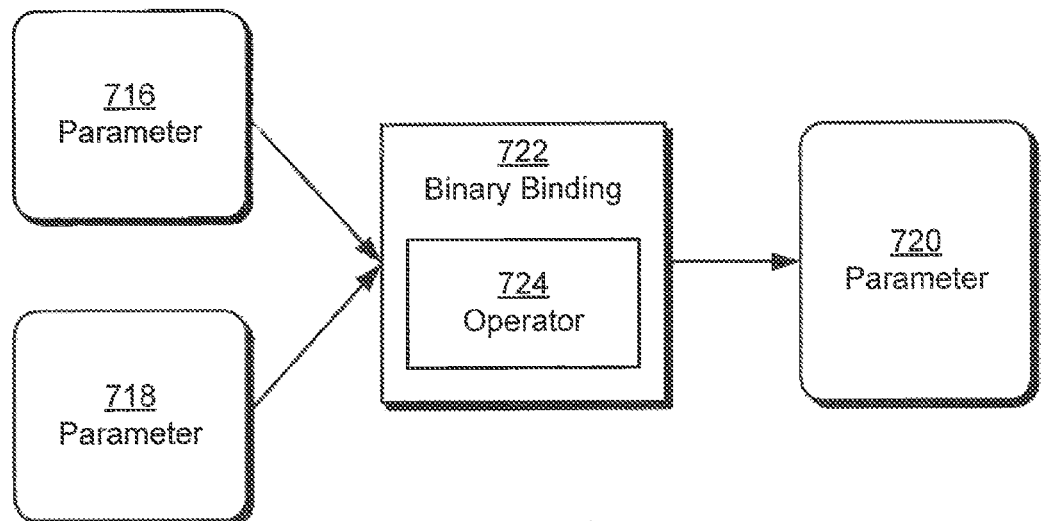
FIG. 7C shows a binary binding between a set of parameters in accordance with an embodiment of the present invention.

FIG. 7C shows a binary binding 722 between a set of parameters 716-720 in accordance with an embodiment of the present invention. As shown in FIG. 7C, binary binding 722 includes two source parameters 716-718 and one destination parameter 720. Binary binding 722 may perform an operation between the values of parameters 716-718 before storing the result in parameter 720. The operation may further be specified by an operator 724 in binary binding 722. For example, binary binding 722 may multiple a matrix from parameter 716 with a matrix from parameter 718 using a matrix multiplication operator 724 and store the resulting matrix in parameter 720. Binary binding 722 may also perform other operations between parameters 716-718, such as arithmetic operations, string operations, matrix algebra operations, and/or mapping operations.

As described above, other types of bindings (e.t., ternary, n-ary, etc.) may exist between parameters. Furthermore, parameters and/or bindings may be programmable. In other words, parameters and/or bindings may be specified using code rather than conventional operators or data types.

Figure 8:
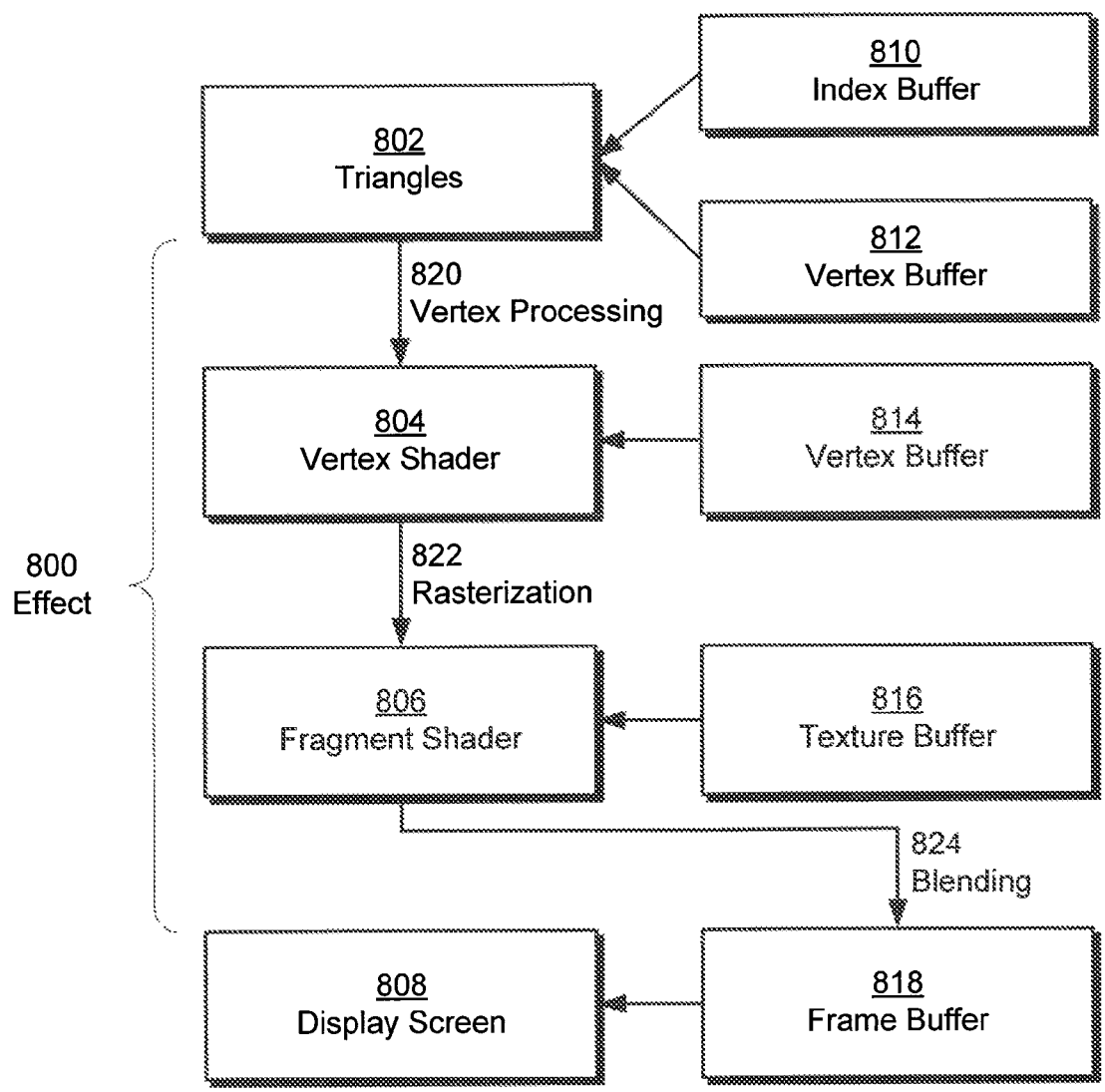
FIG. 8 shows a graphics pipeline in accordance with an embodiment of the present invention.

FIG. 8 shows a graphics pipeline in accordance with an embodiment of the present invention. The graphics pipeline may represent the flow of data and operations in rendering an image from one or more objects in a graphics model. The graphics pipeline may additionally be managed by a plugin for execution on a GPU on behalf of a web application requesting the rendering of the graphics model. Furthermore, a complete description of the graphics pipeline may be provided by an effect 800. As a result, the graphics pipeline may be used to render objects that are assigned to effect 800.

As shown in FIG. 8, the graphics pipeline begins with a set of triangles 802 formed from vertices in a vertex buffer 812 and triangle indices in an index buffer 810. Next, vertex processing 820 is applied to triangles 802. In one or more embodiments of the invention, vertex processing 820 corresponds to geometric operations on triangles 802, such as modeling, viewing, and projection transformations; clipping, culling, lighting, and primitive assembly; lighting; and texture coordinate generation. Parameters and/or states associated with each geometric operation may be provided by effect 800. For example, effect 800 may include a state that sets culling rules for triangles 802 and/or a parameter that moves a light source.

Vertex processing 820 may additionally involve a vertex shader 804 that is specified by effect 800. In particular, vertex shader 804 may correspond to a software program that is written in a shading language such as High Level Shader Language (HLSL), OpenGL Shading Language (GLSL), and/or C for Graphics (Cg). Vertex shader 804 may further be executed by the GPU to perform mathematical operations on vertex data (e.g., colors, textures, coordinates, etc.) obtained from a vertex buffer 814. In addition, vertex shader 804 may execute using a set of shader parameters obtained from effect 800 to ensure that vertex shader 804 produces the desired effect. For example, vertex shader 804 may use the shader parameters to perform operations such as procedural geometry, advanced vertex blending, texture generation, camera effects, and/or advanced lighting models.

After vertex operations are complete, vertex data is converted into pixel data in rasterization 822. During rasterization 822, vertices and edges of triangles 802 are mapped to pixels on a display screen 808. In addition, pixel values (e.g., color, depth, etc.) within the triangles are interpolated based on values at the vertices. Rasterization 822 may also involve a fragment shader 806 that is specified by effect 800.

As with vertex shader 804, fragment shader 806 may be a software program that is written in HLSL, GLSL, Cg, and/or another shading language. Furthermore, fragment shader 806 may be executed by the GPU to perform pixel operations. In particular, fragment shader 806 may combine the pixel values from a fragment with one or more interpolated texture coordinates from a texture buffer 816. Pixel values may further be modified using multi-texturing, fog, blending 824, compositing, bump mapping, shadow mapping, and/or other pixel-level operations specified by effect 800. As with other stages of the graphics pipeline, the behavior of fragment shader 806 and/or other rasterization 822 operations may be affected by shader parameters and/or states provided by effect 800. Finally, pixel values may be written to a frame buffer 818 for display on display screen 808.

Figure 9:
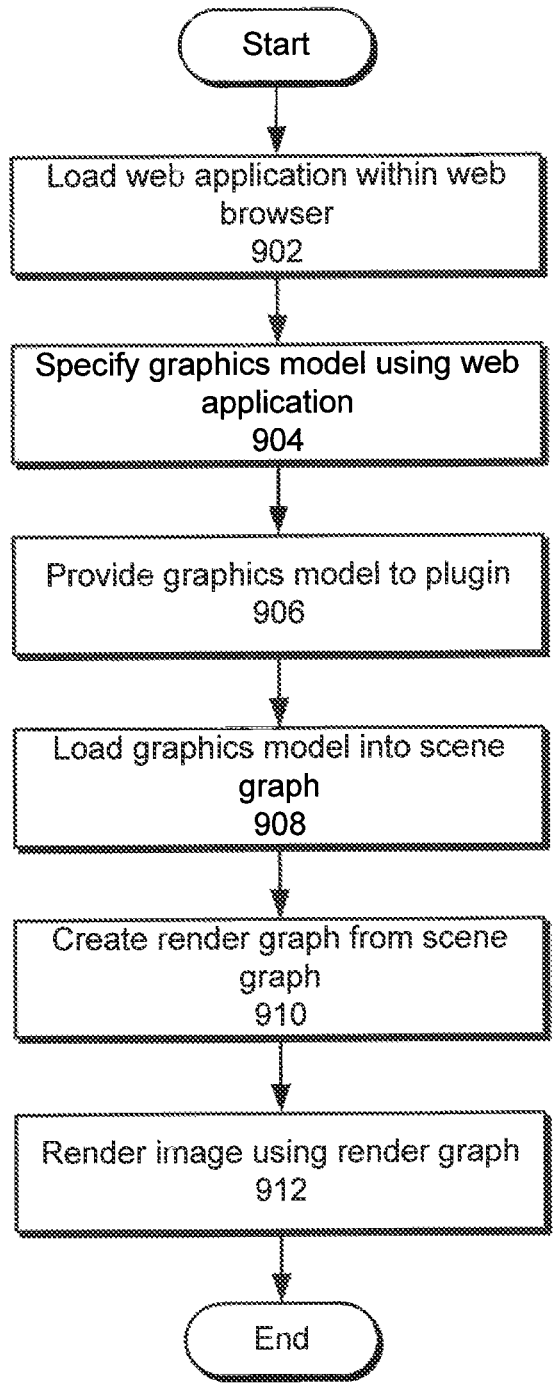
FIG. 9 shows a flowchart illustrating the process of rendering graphics in a computer system in accordance with an embodiment of the present invention.

FIG. 9 shows a flowchart illustrating the process of rendering graphics in a computing system in accordance with an embodiment of the present invention. In one or more embodiments of the invention, one or more of the steps may be omitted, repeated, and/or performed in a different order. Accordingly, the specific arrangement of steps shown in FIG. 9 should not be construed as limiting the scope of the invention.

First, a web application is loaded within a web browser (operation 902). The web application may be obtained from a server by the web browser. Furthermore, the web application may be used to render graphics (e.g., 3D graphics) within the web browser. However, the web application may be written in a scripting language, such as Javascript, that is unsuitable for communication with a GPU in the computing system. As a result, the web application may only include functionality to render graphics using a CPU in the computing system. Alternatively, the web application may use compiled code to process graphics. However, compiled code may lack portability, security, and integrability with other components in the web application.

To enable graphics hardware acceleration using the GPU, the web application may specify a graphics model (operation 904) to be rendered. For example, the web application may provide an input file, such as a COLLADA file, that describes the graphics model. Alternatively, the graphics model may be specified using one or more method calls from the web application to a plugin associated with the web browser. The graphics model may then be provided to the plugin (operation 906) for rendering using the GPU.

To render the graphics model, the plugin loads the graphics model into a scene graph (operation 908). A render graph may then be created from the scene graph (operation 910). As described above, the scene graph and render graph may be created by an editing thread in the plugin.

Finally, an image corresponding to the graphics model is rendered using the render graph (operation 912). More specifically, a render thread may render the graphics model by traversing the render graph as the graphics model is edited by the editing thread. As a result, pipelining may be implemented using the editing thread and the render thread, thus increasing the frame rate associated with rendering the graphics model.

The render thread may provide rendering instructions to a rendering engine in the plugin, which communicates with the GPU using a GPU command stream. The rendering instructions may include the loading of one or more shaders, such as pixel or fragment shaders, into the GPU. The rendering engine may communicate with the GPU through a device driver for the GPU, or the rendering engine may emit hardware commands directly to the GPU. Furthermore, if no GPU is available on the computing system, a software renderer provided by the plugin may be used to render the graphics model on a CPU of the computer system. The rendered image may then be displayed within a plugin window associated with the web browser.

As described above, the GPU may perform calculations related to rendering the image from the graphics model. In particular, the GPU may execute one or more stages of a graphics pipeline associated with an object in the graphics model. The graphics pipeline may further include one or more vertex shaders, one or more pixel shaders, and/or other computationally intensive vertex or pixel operations. As a result, the plugin may allow complex 3D graphics to be rendered in a web environment using graphics hardware acceleration from the GPU.

Embodiments of the present invention may facilitate graphics-related functionality for web applications. More specifically, embodiments of the present invention provide integrated mechanisms for graphics support, particularly 3D graphics support, in scripting languages such as Javascript. Embodiments of the present invention also provide graphics hardware acceleration for web applications, including the use of shaders in the GPU. In addition, embodiments of the present invention enable the loading and rendering of 3D graphics models in standard file formats such as COLLADA from web applications. Some embodiments may also provide a variety of APIs for development in various languages and environments.

As a result, embodiments of the present invention provide a method and system for implementing a variety of applications using web applications. Such applications may include, for example, video editors, CAD editors, 3D computer games, photo editors, and/or catalogs of 3D models. In particular, web applications may implement these applications by interfacing with a platform independent plugin that executes separately from the web applications and exposes GPU resources to the web applications. The features provided by the plugin to the web applications may allow the graphics performance of native applications to be provided by cross platform web applications that do not require installation.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A system for rendering graphics in a computing system, comprising:
    a plugin associated with a web browser in the computing system;
    a web application configured to execute in the web browser, wherein the web application is configured to:
    specify a graphics model; and
    provide the graphics model to the plugin; and
    wherein the plugin is configured to:
    generate a graphics-processing unit (GPU) command stream from the graphics model; and
    send the GPU command stream to a GPU of the computing system, wherein an image corresponding to the graphics model is rendered by the GPU.

2. The system of claim 1, wherein the plugin comprises:
    an editing thread configured to:
    load the graphics model into a scene graph; and
    create a render graph for the graphics model from the scene graph; and
    a render thread configured to render the image using the render graph.

3. The system of claim 2, wherein pipelining is implemented using the editing thread and the render thread.

4. The system of claim 1, wherein the plugin comprises:
    a rendering engine configured to communicate with the GPU using the GPU command stream.

5. The system of claim 4, wherein the plugin further comprises:
    a software renderer configured to render the image using a central processing unit (CPU) of the computing system.

6. The system of claim 1, wherein the graphics model is specified using at least one of an input file and a method call from the web application to the plugin.

7. The system of claim 6, wherein the input file is obtained from a server associated with the web application.

8. The system of claim 6, further comprising:
    a plugin interface configured to process the method call from the web application to the plugin.

9. The system of claim 8, wherein the plugin interface is generated based on an interface description language (IDL) description.

10. The system of claim 1, wherein the image is rendered within a plugin window associated with the web browser.

11. The system of claim 1, wherein the web application and the plugin are platform independent.

12. A method for rendering graphics in a computing system, comprising:
    loading a web application within a web browser;
    specifying a graphics model using the web application;
    providing the graphics model to a plugin associated with the web browser;
    generating a graphics processing unit (GPU) command stream from the graphics model using the plugin; and
    rendering an image corresponding to the graphics model by sending the GPU command stream to a GPU of the computing system.

13. The method of claim 12, wherein generating the GPU command stream involves:
    loading the graphics model into a scene graph;
    creating a render graph for the graphics model from the scene graph; and
    rendering the image using the render graph.

14. The method of claim 12, wherein the plugin comprises:
    a rendering engine configured to communicate with the GPU using the GPU command stream.

15. The method of claim 14, wherein the plugin further comprises:
    a software renderer configured to render the image using a central processing unit (CPU) of the computing system.

16. The method of claim 12, wherein the graphics model is specified using at least one of an input file and a method call from the web application to the plugin.

17. The method of claim 16, wherein the method call from the web application to the plugin is processed using a plugin interface.

18. The method of claim 17, wherein the plugin interface is generated based on an interface description language (IDL) description.

19. A non-transitory computer-readable storage medium storing instructions that when executed by a computer cause the computer to perform a method for rendering graphics in a computing system, comprising:
    loading a web application within a web browser;
    specifying a graphics model using the web application;
    providing the graphics model to a plugin associated with the web browser;
    generating a graphics processing unit (GPU) command stream from the graphics model using the plugin; and
    rendering an image corresponding to the graphics model by sending the GPU command stream to a GPU of the computing system.

20. The computer-readable storage medium of claim 19, wherein generating the GPU command stream involves:
    loading the graphics model into a scene graph;
    creating a render graph for the graphics model from the scene graph; and
    rendering the image using the render graph.

* * * * *